United States Patent [19]

Fleckenstein et al.

[11] 4,028,321
[45] June 7, 1977

[54] BASIC AZO AMINO-PHENYLENE DYESTUFFS

[75] Inventors: Erwin Fleckenstein, Hofheim, Taunus; Peter Mischke, Neuenhain, Taunus, both of Germany

[73] Assignee: Hoechst Aktiengesellschaft, Frankfurt am Main, Germany

[22] Filed: July 23, 1974

[21] Appl. No.: 491,175

[30] Foreign Application Priority Data

July 27, 1973   Germany .......................... 2338135

[52] U.S. Cl. ........................... 260/146 R; 260/147; 260/156; 260/157; 260/158; 260/162; 260/146 D; 260/146 T; 260/153; 260/154; 260/155; 260/283 CN; 260/283 S; 260/244 R; 260/456 A

[51] Int. Cl.² .................. C09B 29/06; C09B 29/08; C09B 29/36; C09B 43/00

[58] Field of Search ............... 260/162, 147, 146 R, 260/156, 157, 158, 146 D, 146 T, 153, 154, 155

[56] References Cited

UNITED STATES PATENTS

| | | | |
|---|---|---|---|
| 2,864,812 | 12/1958 | Bossard et al. | 260/146 R |
| 3,084,153 | 4/1963 | Fishwick et al. | 260/158 |
| 3,148,935 | 9/1964 | Pfitzner et al. | 260/157 X |
| 3,418,309 | 12/1968 | Dale et al. | 260/158 |
| 3,686,162 | 8/1972 | Artz | 260/146 R X |
| 3,763,140 | 10/1973 | Entschel et al. | 260/158 |

*Primary Examiner*—Charles F. Warren
*Attorney, Agent, or Firm*—Connolly and Hutz

[57] ABSTRACT

A basic dyestuff of the formula

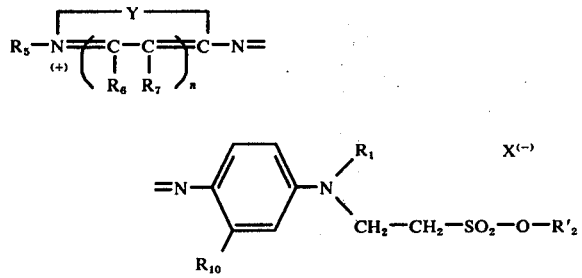

wherein $R_1$ is hydrogen, alkyl of 1 to 5 carbon atoms, hydroxyalkyl of 1 to 4 carbon atoms, cyanoalkyl of 1 to 4 carbon atoms in the alkyl moiety or chloroalkyl of 1 to 4 carbon atoms, $R'_2$ is phenyl or naphthyl or is phenyl or naphthyl substituted by alkyl of 1 to 4 C-atoms and/or alkoxy of 1 to 4 carbon atoms or nitro or cyano and/or chlorine, $R_5$ is an optionally substituted alkyl or aralkyl radical, $R_6$ and $R_7$ being the same or different, each is hydrogen or an alkyl radical or, both together, substituents which complete to form an anellated aromatic ring, Y is a bivalent atom or a bivalent group necessary to complete a 5- or 6-ring, $R_{10}$ is hydrogen, fluorine, bromine or chlorine or alkyl of 1 to 4 C-atoms and $X^{(-)}$ is an anion, which are suitable for the dyeing or printing of tannined cellulose fibers, silk leather or fully synthetic fibers, such as acetate silk, polyamide fibers or acid modified polyamide or polyester fibers, especially of fibers which contain polyacrylonitrile or polyvinylidene cyanide. Their dyeings are in general very intense and have, for example, good fastnesses to light and to wetting processes, to chlorine and perspiration. They are resistant to a large degree to a change of the pH-value of the dyebath and can therefore be used both in a slightly acidic and in a strongly acidic bath. Wool is completely reserved by the dyestuffs under normal dyeing conditions.

4 Claims, No Drawings

BASIC AZO AMINO-PHENYLENE DYESTUFFS

The present invention relates to novel basic azo dyestuffs, to a process for preparing them and to their use.

U.S. patent application Ser. No. 465,689, filed April 30, 1974 now abandoned, relates to basic azo dyestuffs which are free from sulfonic acid groups and correspond to the general formula I

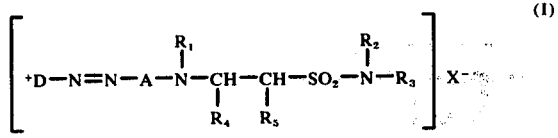

in which $D^+$ represents the radical of a diazo component which contains a quaternary nitrogen atom, A represents an aromatic radical or together with $-N(R_1)-$ a heterocyclic radical, $R_1$ is hydrogen or an optionally substituted alkyl radical, an aralkyl or cycloalkyl radical, $R_2$ is hydrogen or an optionally substituted lower alkyl radical, $R_3$ is an aromatic radical, $R_4$ and $R_5$ each represent hydrogen or a lower alkyl radical and $X^-$ represents an anion, and to processes for preparing them and to their use.

These novel dyestuffs are particularly suitable for the dyeing and printing of textile material of polyacrylonitrile and acid modified polyester fibers.

In further developing this inventive idea, we have found that basic azo dyestuffs which are free from sulfonic acid groups and which correspond to the general formula II

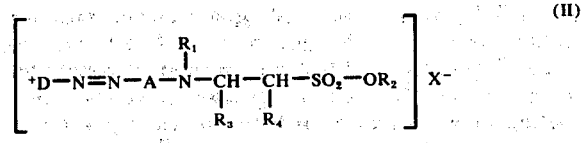

wherein $D^+$ represents the radical of a diazo component which contains a quaternary nitrogen atom, A represents an aromatic radical or together with $-N(R_1)-$ a heterocyclic radical, $R_1$ is hydrogen, an optionally substituted lower alkyl radical, an aralkyl or cycloalkyl radical, $R_2$ is an aromatic radical, $R_3$ and $R_4$ each represent hydrogen or lower alkyl radical and $X^-$ represents an anion, likewise have valuable properties.

The novel dyestuffs can be obtained by a. coupling the diazonium compound of a quaternary amine of the formula III

in which $D^+$ and $X^-$ are defined as for formula II, with a coupling component of the formula IV

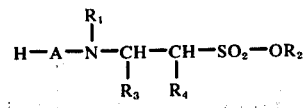

in which A, $R_1$, $R_2$, $R_3$, and $R_4$ are defined as for formula II or by b. treating an azo dyestuff of the formula (V)

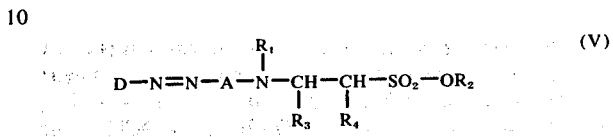

wherein D is the radical of a diazo component and A, $R_1$, $R_2$, $R_3$, and $R_4$ are defined as for formula II with alkylating agents.

The quaternary amines of the formula III used for the process a) can be obtained by treating suitable aromatic or heterocyclic amines with alkylating agents, for example alkyl halides, aralkyl halides, halogenoacetamides, β-halogenopropionitriles, halogeno-hydrines, alkylene oxides, acrylic acid amide, alkyl esters of sulfuric acid or organic sulfonic acids.

Suitable quaternary amines of the formula III are, for example those of the formula VI

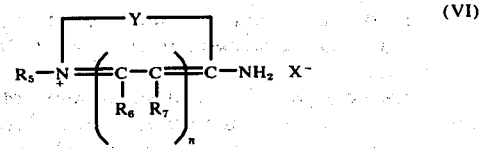

in which $R_5$ represents an optionally substituted alkyl or aralkyl radical, Y is a bivalent atom or a bivalent group necessary to complete a 5- or 6-ring, $R_6$ and $R_7$ each represent hydrogen, alkyl radicals or substituents, which complete to form an anellated aromatic ring, $n$ represents 0 or 1 and X is an anion. Such quaternary compounds may be derived from amines of the pyridine, pyrazole, imidazole, triazole, tetrazole, oxazole, thiazole, selenazole, oxdiazole, thiadiazole, pyrimidine or of the triazine series, furthermore from the quinoline, indazole, benzimidazole, benzisothiazole, arylquanazole, naphthimidazole, benzoxazole, naphthoxazole, benzthiazole or naphthothiazole series.

Further suitable quaternary amines are those of the formulae VII and VIII

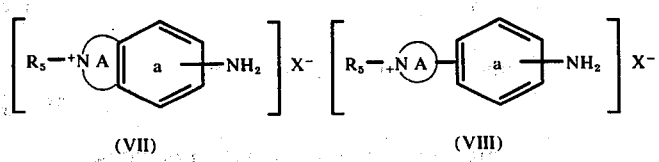

in which $R_5$ represents an optionally substituted alkyl or aralkyl radical, A represents a 5- or 6-membered heterocyclic ring, for example a pyridinium, triazolium, pyrazolium or thiazolium radical and X is an anion and the benzene radical $a$ may contain further substituents such as halogen atoms, alkoxy, aryloxy, alkyl, trifluoromethyl, nitro, alkylsulfone, arylsulfone, cyano or acyl groups.

Finally, quaternary amines of the formulae IX and X

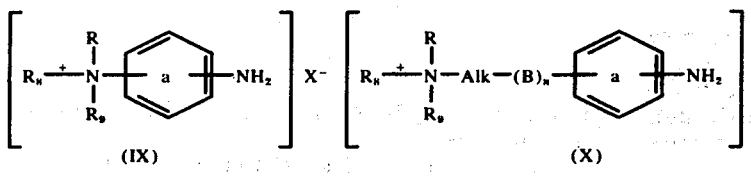

may be used, in which $R_8$, $R_9$ and R each represent optionally substituted lower alkyl groups, Alk is a linear or branched lower alkylene radical, B is —O—, —S—, a —CO—, —SO₂ —, —CONH—, —OCO— or —SO₂NH— group, n is 0 or 1 and X represents an anion and the benzene radical a may contain further substituents, for example halogen atoms, alkoxy, aryloxy, alkyl, trifluoromethyl, nitro, alkylsulfone, arylsulfone, cyano or acyl groups.

As coupling components of the formula IV there may be used secondary or tertiary amines of the benzene or naphthaline series.

$R_1$ may represent hydrogen or a methyl, ethyl, propyl or butyl radical, which may contain further substituents such as halogen atoms, hydroxy, cyano, acyloxy, carbalkoxy, carbamoyl, dialkylamino, alkoxy, trifluoromethyl, acyl, carbamic acid ester, alkylsulfone, sulfamoyl or aryloxy groups.

$R_1$ may also be an aralkyl radical, for example a benzyl radical, or a cycloalkyl radical, for example a cyclohexyl radical.

$R_2$ may be a phenyl radical which may contain further substituents such as halogen atoms, alkyl, alkoxy, aryloxy, trifluoromethyl, acyl or alkylsulfone groups.

$R_3$ and $R_4$ may represent hydrogen or a methyl, ethyl or propyl radical. A may represent together with

a heterocyclic radical, for example a 1,2,3,4-tetrahydroquinoline or benzoquinoline radical or a benzomorpholine radical.

Furthermore, the aromatic radical A may contain substituents, for example halogen atoms, alkyl, alkoxy, carbalkoxy, alkylsulfonyl, carbamoyl, sulfamyl, amino, trifluoromethyl, acyl or acylamino groups.

Coupling components of the formula

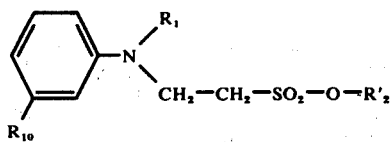

in which $R_1$ represents a hydrogen atom, in particular an alkyl, hydroxyalkyl, cyanoalkyl or chloroalkyl group the alkyl groups of which contain 1 to 4 carbon atoms, $R'_2$ represents a phenyl or naphthyl group which may be substituted by alkyl and/or alkoxy groups of 1 to 4 carbon atoms or a nitro or cyano group and/or chlorine atoms, and $R_{10}$ represents a hydrogen, fluorine, chlorine or bromine atom or an alkyl group of 1 to 4 carbon atoms are preferred.

Among the novel compounds of the present invention, especially those are particularly advantageous which correspond to the general formula

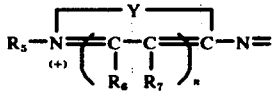

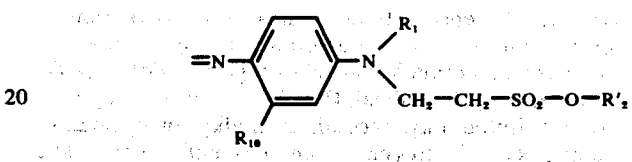

in which $R_5$ represents an alkyl group of 1 to 4 carbon atoms or the benzyl radical, $R_6$ and $R_7$, which may be identical or different, represent hydrogen or an alkyl group of 1 to 4 carbon atoms or both together represent an anellated benzene ring of the formula

in which $R_{11}$ represents a hydrogen, chlorine, bromine or fluorine atom, an alkyl group of 1 to 4 carbon atoms or an alkoxy group of 1 to 4 carbon atoms, Y represents an oxygen or sulfur atom or a group necessary for completing a heterocyclic 5- or 6-membered ring, n represents 0 or 1, X⁻ represents an anion, $R_1$ represents a hydrogen atom and, in particular, an alkyl, hydroxyalkyl, cyanoalkyl or chloroalkyl group of 1 to 4 carbon atoms in the alkyl radicals, $R'_2$ represents a phenyl or naphthyl group which may be substituted by alkyl and/or alkoxy groups each of 1 to 4 carbon atoms or a nitro or cyano group and/or chlorine atoms, and $R_{10}$ represents a hydrogen, fluorine, chlorine or bromine atom or an alkyl group of 1 to 4 carbon atoms.

Among these compounds, there are preferred especially those compounds which correspond to the general formula

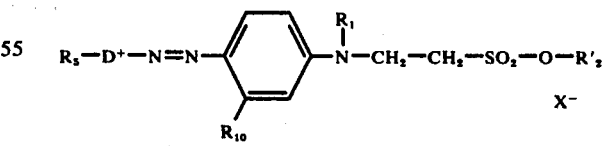

in which $R_1$, $R_{10}$, $R'_2$, and X⁻ have the meaning given above and D⁺ represents a triazolium, thiazolium, pyrazolium, imidazolium, pyridinium, benztriazolium benzthiazolium, benzpyrazolium or benzimidazolium or benzisothiazolium group the heterocyle of which is substituted by $R_5$ and may additionally be substituted by phenyl or benzyl groups, preferably by alkyl groups of 1 to 4 carbon atoms and the anellated benzene ring of which may be substituted by alkyl groups of 1 to 4 carbon atoms, alkoxy groups of 1 to 4 carbon atoms or by chlorine atoms.

The coupling components of the formula IV may be obtained, for example according to the following formula scheme in which A, $R_1$, $R_2$, $R_3$ and $R_4$ have the above meaning:

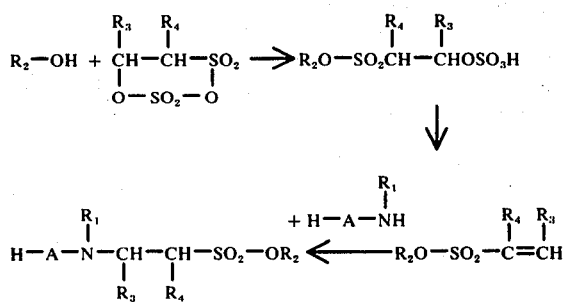

Diazotation of the amines of the formula III may be effected according to known methods, for example by means of alkyl nitrite and an inorganic acid, for example hydrochloric acid, sulfuric acid or phosphoric acid, or by means of nitrosyl sulfuric acid.

Coupling with the coupling components of the formula IV may also be carried out in known manner, for example in a neutral to acidic medium, if desired in the presence of sodium acetate or similar buffer substances or catalysts which influence the coupling speed, such as dimethylformamide, pyridine or the salts thereof.

The starting dyestuffs of the formula V used in method b) may be obtained by coupling the diazotized amines of the formula D-$NH_2$ with the coupling components or by condensation of the amines with the corresponding p-nitroso compounds of the amines of the formula IV.

The method b) is particularly suitable for amines of the formula XI

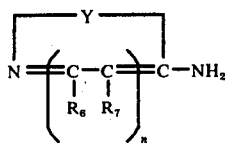 (XI)

in which $n$, Y, $R_6$ and $R_7$ have the above meanings. As amines of the formula XI, there may be used especially those of the pyridine, pyrazole, imidazole, triazole, tetrazole, oxazole, thiazole, selenazole, oxdiazole, thiadiazole, pyrimidine or triazine series, furthermore of the quinoline, indazole, benzimidazole, benzisothiazole, arylguanazole, naphthimidazole, benzoxazole, naphthoxazole, benzthiazole or naphthothiazole series.

As alkylating agents, there may be used alkyl halides, aralkyl halides, halogenoacetamides, β-halogenopropionitriles, halogenohydrines, alkylene oxides, acrylic acid amides, alkyl esters of sulfuric acid or alkyl esters of organic sulfonic acids.

Suitable alkylating agents are, for example methyl chloride, methyl bromide or methyl iodide, ethyl bromide or ethyl iodide, propyl bromide or propyl iodide, benzyl chloride, chloroacetamide, β-chloropropionitrile, ethylene-chlorohydrine, dimethyl sulfate, benzene-sulfonic acid methyl ester, p-toluenesulfonic acid methyl, -ethyl, -propyl or -butyl ester. The alkylation is suitably carried out in an inert organic solvent, for example in a hydrocarbon, chloro-hydrocarbon or nitrohydrocarbon such as benzene, toluene, xylene, tetrachloroethane, chloroform, carbon tetrachloride, mono- or dichlorobenzene or nitrobenzene, in an acid amide or acid anhydride such as dimethylformamide, N-methylacetamide or glacial acetic acid anhydride, in dimethyl sulfoxide or in a ketone such as acetone or methylethyl-ketone. Instead of an organic solvent there may also be used an excess of alkylating agent.

Depending on the number of alkylatable nitrogen atoms of the starting dyestuff, one or several alkyl groups may be introduced into the dyestuff molecule. The alkylation is carried out at an elevated temperature, if desired with addition of acid-binding agents such as magnesium oxide, magnesium carbonate, soda, calcium carbonate or sodium bicarbonate and, if desired, under pressure. The most favorable conditions in each case may be easily determined by a preliminary test.

The alkylation may also be effected in water.

The novel dyestuffs may also be obtained - when modifying the above process - by coupling a hydrazone of benzenesulfonyl hydrazone of the general formula XIII

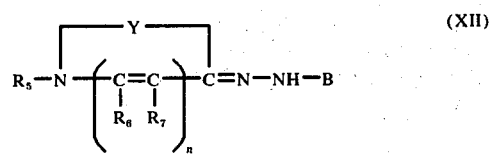 (XII)

in which Y, $R_5$, $R_6$, $R_7$ and $n$ have the meaning given for formula VI and B is hydrogen or a benzenesulfonyl radical, with a coupling component of the formula IV under the action of oxydizing agents.

The novel dyestuffs contain as anion $X^-$ preferably the radical of a strong acid, for example of sulfuric acid or semi-esters thereof, of an arylsulfonic acid or of a halohydric acid. These anions introduced according to the process of the invention can be replaced by anions of other acids, for example those of phosphoric acid, acetic acid, oxalic acid, lactic acid or tartaric acid. The dyestuffs may also be obtained in the form of their double salts with zinc or cadmium halides.

The dyestuffs are suitable for the dyeing or printing of tannined cellulose fibers, silk, leather or fully synthetic fibers, such as acetate silk, polyamide fibers or acid modified polyamide or polyester fibers, especially of fibers which contain polyacrylonitrile or polyvinylidene cyanide. The dyeings obtained on these fibers are in most cases very intense and have generally a good fastness to light and to wetting, for example a good fastness to washing, fulling, cross-dyeing, carbonizing, chlorine and perspiration, as well as a good fastness to decatizing, steaming, ironing, rubbing and solvents. In general, the dyestuffs are to a large degree resistant to a change of the pH-value of the dyebath and can therefore be used both in a slightly acidic and in a strongly acidic bath. Furthermore, they are stable at temperatures above 100° C, as those applied in high temperature dyeing. Wool is completely reserved by the dyestuffs under normal dyeing conditions.

Dyeing is generally carried out in an aqueous medium at boiling temperature or in closed vessels at temperatures above 100° C and under pressure. Furthermore, the dyestuffs can also be applied from organic solvents.

The dyestuffs may also be added to spinning solutions for the preparation of polyacrylonitrile-containing fibers, but they also dye unstretched fibers.

To prepare the aqueous dyebaths and printing pastes the dyestuffs can be used in the form of powders which may contain fillers, for example inorganic salts, dextrin and, if desired, further additives. It is more advantageous to use concentrated aqueous solutions of the dyestuffs which are easier to handle and which contain about 20 to 60% of dyestuff, one or several lower aliphatic carboxylic acids such as formic acid, acetic acid, propionic acid or lactic acid as well as, if desired, other additives such as water-soluble polyhydric alcohols, the ethers or esters thereof, polyethers, aliphatic carboxylic acid amides, lactams, lactones, nitriles, dimethyl-sulfoxide, diacetone alcohol, dioxane, tetra-hydrofurane or urea as well as water.

To prepare the dyebaths which contain organic solvents only, for example chlorohydrocarbons, there are preferably used concentrated solutions which contain the dyestuff as a free base or as a salt of a monobasic organic acid, and a chlorohydrocarbon, an organic acid and a polar organic solvent.

With anionic precipitants such as argillaceous earth, tannine or heteropoly-acids, the novel dyestuffs form fast pigments which can be used in paper printing.

The following Examples illustrate the invention. Parts and percentages are by weight unless stated otherwise.

EXAMPLE 1

8.4 Parts by weight of 3-amino-triazole-(1,2,4) were diazotized in 80 parts by weight of semi-concentrated sulfuric acid at 0° with 32 parts by weight of 40% nitrosylsulfuric acid. The diazonium solution was stirred into a solution of 30.5 parts by weight of the compound of the formula

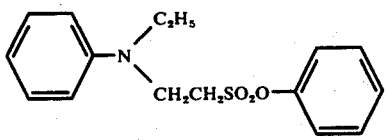

in 100 parts by weight of semi-concentrated sulfuric acid at 0° C. When coupling was completed, the reaction mixture was diluted with 2000 parts by weight of water, the dyestuff of the formula

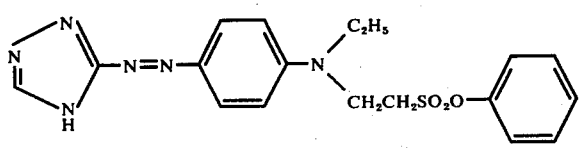

that had precipitated was filtered off with suction, washed with water until free from acid and dried.

20 Parts by weight of the dry dyestuff were dissolved in 200 parts by weight of chlorobenzene, combined with 4 parts by weight of magnesium oxide and alkylated with 20 parts by weight of dimethyl sulfate at 70°–80° C. When the reaction was completed, the solvent was removed; after addition of 20 parts by weight of concentrated hydrochloric acid with steam, the dyestuff solution was clarified with active charcoal. The dyestuff was precipitated by the addition of zinc chloride, filtered off with suction and dried at 60° C. 24 Parts by weight of the dyestuff of the formula

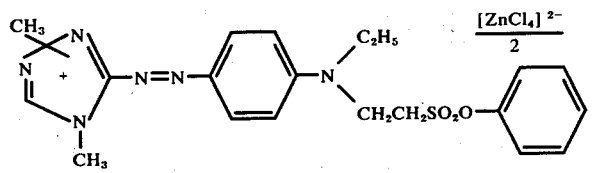

were obtained, which dyed polyacrylonitrile and acid modified polyester fibers very brilliant, fast yellowish red shades.

EXAMPLE 2

18.0 Parts by weight of 2-amino-6-methoxy-benzothiazole were dissolved in 150 parts by weight of semi-concentrated sulfuric acid and diazotized at 0° C with 32 parts by weight of 40% nitrosyl-sulfuric acid. The diazonium salt solution was added at 0° C to a solution of 31.9 parts by weight of a compound of the formula

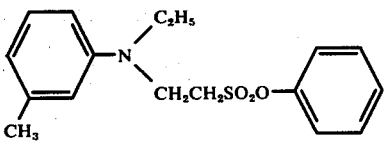

in 100 parts by weight of semi-concentrated sulfuric acid. When coupling was completed, the dyestuff that had precipitated was filtered off with suction, stirred with a dilute bicarbonate solution, again filtered off with suction and dried at 60° C. 46.1 Parts by weight of the dyestuff of the formula

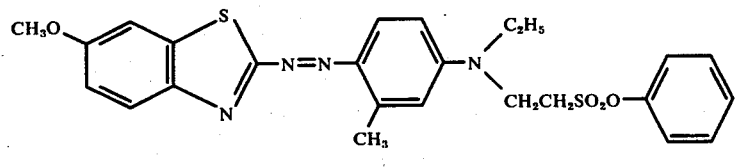

were obtained. 25.0 Parts by weight of the dyestuff so obtained were dissolved in 250 parts by weight of chlorobenzene, combined with a small amount of magnesium oxide and alkylated with 10 parts by weight of dimethyl sulfate at 80° C. When the reaction was completed, the solvent was removed with the aid of steam and the dyestuff solution was clarified with active charcoal. After addition of a mixture of zinc chloride and sodium chloride, the dyestuff was filered off with suction, washed with a 20% sodium chloride solution and dried at 60° C. There were obtained 28.1 parts by weight of a dyestuff of the formula

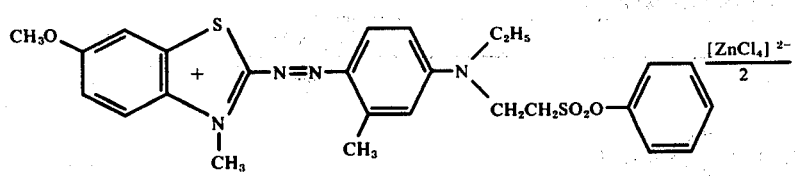

which dyed polyacrylonitrile and acid modified polyester fibers fast blue shades.

The following table indicates further dyestuffs of the invention and the shades obtained with them on polyacrylonitrile and acid modified polyester fibers. The dyestuff formulae indicated in this table contain partly, in abbreviated form, a diazo radical $D_1$, $D_2$, $D_3$ or $D_4$ of the following formulae:

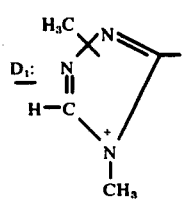

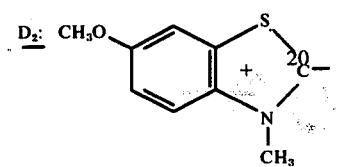

-continued

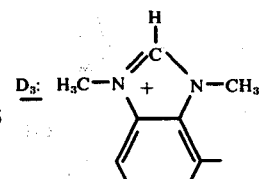

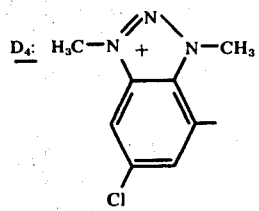

TABLE

| Ex. | Dyestuff | Shade |
|---|---|---|
| 3 | 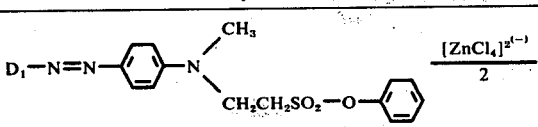 | yellowish red |
| 4 | 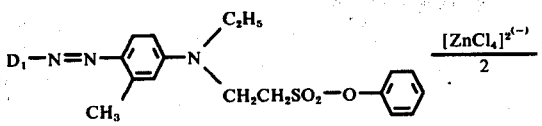 | red |
| 5 | 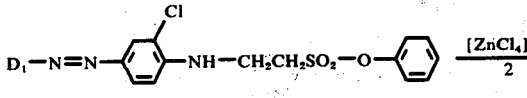 | yellowish red |
| 6 | 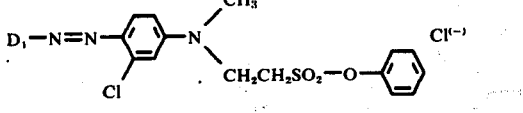 | scarlet |
| 7 | 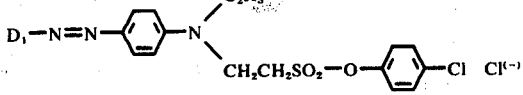 | yellowish red |
| 8 | 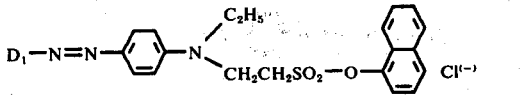 | yellowish red |
| 9 | 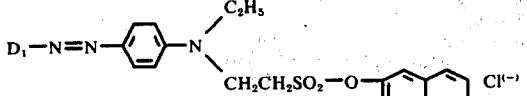 | yellowish red |
| 10 | 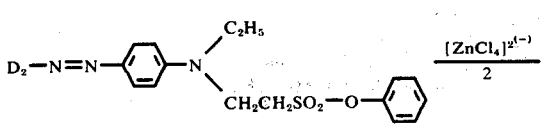 | blue |

TABLE-continued

| Ex. | Dyestuff | Shade |
|---|---|---|
| 11 | $D_2-N=N-$⟨aryl with $CH_3$, $N(C_2H_5)(CH_2CH_2SO_2-O-$⟨C$_6$H$_4$-CH$_3$⟩)⟩ $Cl^{(-)}$ | blue |
| 12 | $D_2-N=N-$⟨aryl with $N(C_2H_5)(CH_2CH_2SO_2-O-$⟨C$_6$H$_4$-Cl⟩)⟩ $Cl^{(-)}$ | blue |
| 13 | $D_2-N=N-$⟨aryl with $CH_3$, $N(C_2H_5)(CH_2CH_2SO_2-O-$⟨C$_6$H$_4$-OCH$_3$⟩)⟩ $\frac{[ZnCl_4]^{2(-)}}{2}$ | blue |
| 14 | benzothiazolium (N-CH$_3$) $-N=N-$⟨aryl with $N(C_2H_5)(CH_2CH_2SO_2-O-C_6H_5)$⟩ $\frac{[ZnCl_4]^{2(-)}}{2}$ | blue |
| 15 | thiazolium (N-CH$_3$) $-N=N-$⟨aryl with $N(C_2H_5)(CH_2CH_2SO_2-O-C_6H_5)$⟩ $\frac{[ZnCl_4]^{2(-)}}{2}$ | violet |
| 16 | thiazolium (N-CH$_3$) $-N=N-$⟨aryl with $CH_3$, $N(C_2H_5)(CH_2CH_2SO_2-O-C_6H_5)$⟩ $\frac{[ZnCl_4]^{2(-)}}{2}$ | violet |
| 17 | 1,2,4-triazolium (1-phenyl, 2,4-di-CH$_3$, 5-HN=) $-N=N-$⟨aryl with $N(C_2H_5)(CH_2CH_2SO_2-O-C_6H_5)$⟩ $Cl^{(-)}$ | yellowish red |
| 18 | pyrazolium (1,3-di-CH$_3$, 2-phenyl) $-N=N-$⟨aryl with $N(C_2H_5)(CH(CH_3)CH_2SO_2-O-C_6H_5)$⟩ $Cl^{(-)}$ | red |
| 19 | $(CH_3)_3N^{(+)}-$⟨aryl with Cl⟩$-N=N-$⟨aryl with $N(C_2H_5)(CH_2CH_2SO_2-O-C_6H_5)$⟩ $Cl^{(-)}$ | yellow |
| 20 | $(CH_3)_3N^{(+)}-$⟨aryl with Cl⟩$-N=N-$⟨aryl with $CH_3$, $N(C_2H_5)(CH_2CH_2SO_2-O-C_6H_5)$⟩ $Cl^{(-)}$ | golden yellow |
| 21 | ⟨aryl with Cl and $(CH_3)_3N^{(+)}$⟩$-N=N-$⟨aryl with $N(C_2H_5)(CH_2CH_2SO_2-O-C_6H_5)$⟩ $Cl^{(-)}$ | yellow |

TABLE-continued

| Ex. | Dyestuff | Shade |
|---|---|---|
| 22 | (CH₃)₃N⁺—⟨OCH₃⟩—N=N—⟨⟩—N(CH₃)—CH₂—CH(CH₃)—SO₂—O—⟨CH₃⟩  Cl⁻ | orange |
| 23 | (CH₃)₃N⁺—⟨NO₂⟩—N=N—⟨⟩—N(CH₃)—CH(CH₃)—CH(CH₃)—SO₂—O—⟨CH₃O⟩  Cl⁻ | orange |
| 24 | (CH₃)₃N⁺—⟨Cl⟩—N=N—⟨Cl⟩—NHCH₂CH₂SO₂—O—⟨⟩  Cl⁻ | yellow |
| 25 | (CH₃)₃N⁺—CH₂—CO—⟨⟩—N=N—⟨⟩—N(C₂H₅)—CH₂CH₂SO₂—O—⟨⟩  Cl⁻ | golden yellow |
| 26 | (CH₃)₃N⁺—CH₂—CO—⟨⟩—N=N—⟨CH₃⟩—N(CH₂CH₃)—CH₂CH₂SO₂—O—⟨⟩  Cl⁻ | orange |
| 27 | pyridinium⁺—CH₂—CO—⟨⟩—N=N—⟨Cl⟩—NH—CH₂CH₂—SO₂—O—⟨⟩  Cl⁻ | yellow |
| 28 | (CH₃)₃N⁺(CH₂)₃—HNSO₂—⟨⟩—N=N—⟨Cl⟩—NHCH₂CH₂SO₂—O—⟨⟩  Cl⁻ | yellow |
| 29 | (CH₃)₃N⁺(CH₂)₃HN—SO₂—⟨⟩—N=N—⟨CH₃⟩—N(C₂H₅)—CH₂CH₂SO₂—O—⟨⟩  Cl⁻ | orange |
| 30 | D₃—N=N—⟨⟩—N(C₂H₅)—CH₂CH₂SO₂—O—⟨⟩  Cl⁻ | orange |
| 31 | D₃—N=N—⟨CH₃⟩—N(C₂H₅)—CH₂CH₂SO₂—O—⟨⟩—CH₃SO₄⁻ | red |
| 32 | D₃—N=N—⟨⟩—N(CH₂—⟨⟩)—CH₂CH₂SO₂—O—⟨⟩  Cl⁻ | red |

TABLE-continued

| Ex. | Dyestuff | Shade |
|---|---|---|
| 33 | 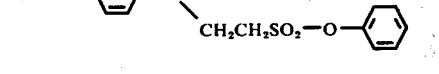 | red |
| 34 | 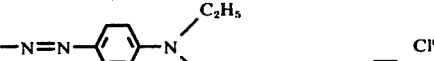 | claret |
| 35 | 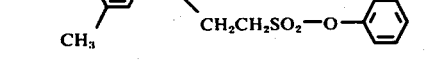 | claret |
| 36 |  | claret |
| 37 |  | blue |
| 38 |  | blue |
| 39 |  | blue |

We claim:
1. A basic dyestuff of the formula

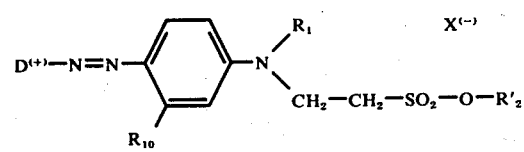

wherein $R_1$ is hydrogen, alkyl of 1 to 5 carbon atoms, hydroxyalkyl of 1 to 4 atoms, cyanoalkyl of 1 to 4 carbon atoms in the alkyl moiety or chloroalkyl of 1 to 4 carbon atoms, $R'_2$ is phenyl or naphthyl or is phenyl or naphthyl substituted by one or more of alkyl of 1 to 4 carbon atoms, alkoxy to 1 to 4 carbon atoms, nitro, cyano, and chlorine, $D^+$ is

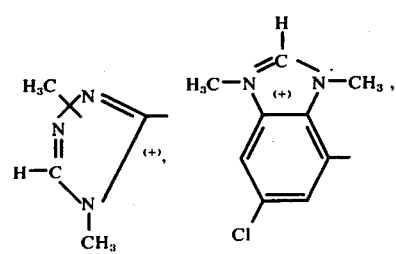

-continued

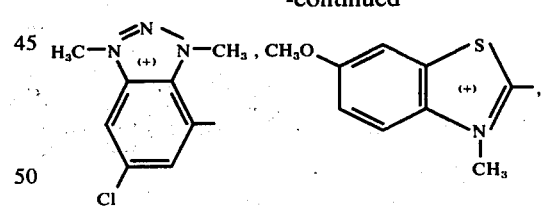

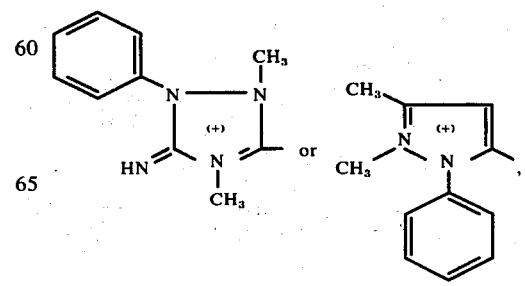

$R_{10}$ is hydrogen, fluorine, bromine, chlorine, or alkyl of 1 to 4 carbon atoms $X^-$ is an anion.
2.
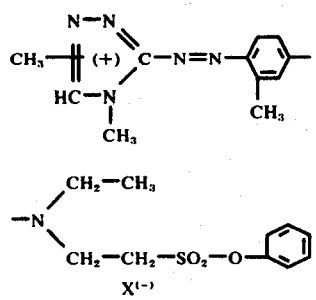
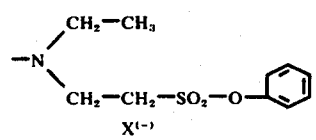
in which $X^-$ is chloride, 1/2 sulfate, $CH_3SO_4^-$,
$$\frac{[ZnCl_4]^{2(-)}}{2}$$
or acetate.
3. The dyestuff of the formula
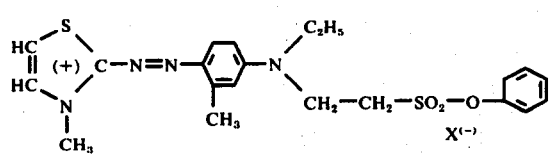
in which $X^-$ is chloride, 1/2 sulfate, $CH_3SO_4^-$,
$$\frac{[ZnCl_4]^{2(-)}}{2}$$
or acetate.
4. The dyestuff of the formula
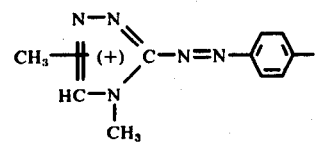
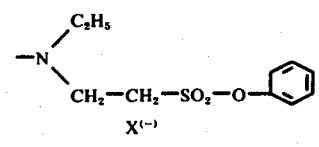
in which $X^-$ is chloride, 1/2 sulfate, $CH_3SO_4^-$,
$$\frac{[ZnCl_4]^{2(-)}}{2}$$
or acetate.
* * * * *